United States Patent [19]

Dunn, Jr.

[11] 4,331,645

[45] May 25, 1982

[54] ALUMINA FROM ALKALI METAL-ALUMINUM CHLORIDE COMPLEXES

[75] Inventor: Wendell E. Dunn, Jr., Spearfish Canyon, S. Dak.

[73] Assignee: Reynolds Metals Company, Richmond, Va.

[21] Appl. No.: 255,551

[22] Filed: Apr. 20, 1981

[51] Int. Cl.$^3$ ................................................ C01F 7/02
[52] U.S. Cl. .................................... 423/625; 423/463; 423/500; 423/504; 423/133; 423/111; 423/DIG. 16
[58] Field of Search .............. 423/111, 133, 135, 136, 423/496, 625, 463, 500, 504

[56] References Cited

U.S. PATENT DOCUMENTS

| | | | |
|---|---|---|---|
| 3,376,112 | 4/1968 | Dunn et al. | 423/502 |
| 3,729,543 | 4/1973 | Dunn | 423/138 |
| 3,887,694 | 6/1975 | Dunn | 423/504 |
| 3,944,647 | 3/1976 | Bonsack | 423/504 |

FOREIGN PATENT DOCUMENTS 470499  8/1972  U.S.S.R. ............................. 423/625

*Primary Examiner*—Herbert T. Carter
*Attorney, Agent, or Firm*—Lyne, Girard & McDonald

[57] ABSTRACT

A method for the production of reduction cell grade alumina from alkali metal/aluminum chloride complexes comprising the steps of:

A. reacting the alkali metal/aluminum chloride complexes with oxygen in a three phase fluidized bed comprising:
 (I) as a solid phase, particles or pebbles of alumina of at least about 1/16" in average diameter;
 (II) as a gaseous phase oxygen fed at a rate to provide a fluidizing gas velocity above about 8'/sec.; and
 (III) as a liquid phase coating the particles of alumina an alkali metal/aluminum chloride complexes; and B. separating the product solids from the gases exiting the fluidized bed.

2 Claims, No Drawings

ALUMINA FROM ALKALI METAL-ALUMINUM CHLORIDE COMPLEXES

FIELD OF THE INVENTION

This invention relates to the opening of aluminous ores to obtain alumina, more particularly to the recovery of alumina from aluminum chloride produced by high temperature chlorination of aluminous ores by oxidation or hydrolysis of a complex of alkali metal chloride with the aluminum chloride.

BACKGROUND OF THE INVENTION

Energy, environmental and raw material supply problems daily become more critical in the production of aluminum. Recent research activity has included not only studies of a multitude of liquid extraction approaches (i.e. the so-called "acid processes") but also processes analogous to those used in the production of titanium pigment in which ilmenite or rutile is chlorined at high temperature to provide titanium tetrachloride which, after purification, can be oxidized to make high grade titanium dioxide pigment.

Although the use of aluminum chloride reduction cells may be important in the future, there still remains the problem of providing alumina for the huge existing alumina reduction facilities. Thus attention has turned to the oxidation of aluminum chloride to provide feed for the existing alumina reduction facilities.

Oxidation of aluminum trichloride, like the oxidation of titanium tetrachloride, is thermodynamically favored and has been commercially practiced with the co-oxidation of aluminum chloride in titanium tetrachloride jet oxidation reactors to make alumina coated pigments.

Unlike the oxidation of its chemically similar analogue, iron trichloride, the oxidation of aluminum chloride is not limited by thermodynamic equilibria at higher temperatures. Thus, oxidation is quite feasible in a flame reactor. However, purification of the aluminum chloride is very difficult, particularly in the separation from iron, titanium and silicon chlorides.

Aluminum chloride is a subliming solid at normal manufacturing and handling pressures and is extremely corrosive to metals, so its favorable features of oxidation over iron chloride oxidation are to some extent counterbalanced by these deficits and, more importantly, by the purity requirements for alumina to be used as reduction cell feed.

In response to environmental protection necessities, the extensive surface area of Bayer process alumina has been used to recover and recycle fluorides vaporized from the cells. As a result, the conventional specifications for alumina for reduction cell use include surface areas of the order of 75 m²/g. But it is not essential to the aluminum reduction process that such surface areas be produced, so long as other sources of high surface area material are available for fluoride recovery purposes.

In the oxidation of aluminum cloride, the collection of aluminum chloride from the gas stream containing the chlorinator combustion gases and the impurity chlorides derived from the aluminous ore is a major problem. The complexing of aluminum chloride by alkali chlorides has been known for years, and the vapor pressure reduction by 1/1 mol or greater amount of alkali chloride is several orders of magnitude.

Even more important, the complex is in liquid form and can be easily handled compared with powder handling of aluminum chloride, a very hydroscopic and easily contaminated solid.

SUMMARY OF THE INVENTION

A method for the production of reduction cell grade alumina from alkali metal/aluminum chloride complexes comprising the steps of:

A. reacting the alkali metal/aluminum chloride complexes with oxygen in a three phase fluidized bed comprising:
  (I) as a solid phase, particles or pebbles of alumina of at least about 1/16" in average diameter;
  (II) as a gaseous phase oxygen fed at a rate to provide a fluidizing gas velocity above about 8'/sec.; and
  (III) as a liquid phase coating the particles of alumina an alkali metal/aluminum chloride complex; and
B. separating the product solids from the gases exiting the fluidized bed.

The present invention describes a process which will produce an alumina of high purity by a process which is rapid and complete and which uses an alkali chloride complex of aluminum chloride which is easier to make, collect and handle than aluminum chloride. The process described herein substitutes a fluidized bed oxidation reactor for the more conventional flame reactor, while making an easily collected alumina product.

The instant process is a high temperature three phase process that can be conducted at high throughput in a fluidized bed which abrades the solid product and allows it to be taken overhead avoiding the necessity for extensive separation of the product from the reaction medium.

The process is a high shear process in which the solid product is deposited on a solid surface of the product material, which is covered by a liquid containing one reactant while serving to shield the other reactant (oxygen) from the solid oxide surface where the reaction occurs. The liquid presents a formidable diffusion barrier to the reactant gas.

The present invention overcomes the inherent problems normally encountered when attempting to carry out gas-solid fluidization process reactions with liquids present and allows a three phase system to exist and produce the desired reaction. The process enables the highly exothermic aluminum chloride oxidation to be conducted in a simple reactor where the reactor walls can be easily protected against the corrosion of high temperature aluminum chloride while allowing the transfer of large amounts of heat.

Suprisingly, this invention permits the introduction of either a solid or liquid aluminum chloride complex as a reactant feed. The subsequent formation of a liquid phase from the use of a solid feed does not disturb the fluidization qualities of the reactor.

The process described herein permits the heat produced by the exothermic reaction to be retained by the fluidized media until it is transferred through the wall of the reactor or through internal cooling surfaces while acting as a reservoir for the heat which imparts stability to the reaction. Such stabilization is not found in flame reactors.

The high shear between the gas and the liquid phases disposed on the solid surface allows lower reaction temperatures than found in flame reactors. This reduces the occurrence of a gas phase nucleated reaction which produces small particles which are difficult to collect and have no significant surface area.

The process of the instant invention produces highly crystalline, large particle size aluminas of low surface area. These aluminas are easily collected and fed to alumina reduction cells.

DESCRIPTION OF THE INVENTION

The process which I have invented to convert alkali chloride complexed aluminum chloride to alumina crystals depends upon a fluidized bed reactor of large particle size (i.e. 1/16-½" diameter), fluidized at high gas velocities (above about 8'/sec.) and operating with a liquid phase. Although it is generally thought that fluidized beds must have low particle size so that fluidization will be smooth, I have discovered that this is a misconception.

The phenomenon of fluidization is a broad effect which can be observed in many natural processes at far larger particle size than currently practiced in chemical reactors. Volcanoes have been known to fluidize rocks, and fluidizing of grapefruit-sized hail is a frequent phenomenon observed in violent thunderstorms.

Such hail is really part of a fluidized system occurring in the thunderhead cloud as evidenced by the layered structure built up in numerous trips from lower to higher regions of the cloud.

In my aluminum chloride oxidizer the particles used are tabular alumina pebbles large enough to require a fluidization velocity that will cause high shear on the liquid layer; particles large enough so that the numerous energy absorbing interparticle contacts total small energy losses compared to the total mechanical energy imparted to the system by the high velocity of reactant and product gases.

The fluidized reactor can be constructed either with heat transmitting walls or as an adiabatic reactor, depending upon the reaction temperature desired. In the case of the aluminum chloride oxidation at low temperature, it is desirable to keep the reactor temperature below the melting temperature of the alkali chloride used in the complex or above about 500° C. The walls of small reactors can be of sufficient area to provide the necessary heat transfer surface. For larger reactors, internal heat transfer surface may be necessary. Alternatively, a multiple bank of smaller reactors can be substituted.

Feed of solid complex to the reactor can be through the gas feed system. Liquid feed can be injected through openings in the reactor wall at any of a variety of convenient points. The reaction which takes place at the entrance point is minimal and any deposit which might build up is abraded by the wall-bed pebble contact which avoids plugging.

Heat-up of the reactor can be accomplished by introducing a gas-oxygen mixture such as Selas gas or by burning carbon with air or $N_2/O_2$ mixtures. Heat can also be transferred to and from the reactor by circulation of the pebbles to a heating or cooling zone.

Preparation of the aluminum chloride complex is important only with regard to impurity level. There may be an excess of either aluminum or alkali chloride in the complex, and the complex may be fed to the reactor in either solid or liquid form. The acceptable impurity level for the feed will be determined by the impurity level which can be tolerated for the cell feed. Normally this level will be below about 0.01% by weight.

In removing aluminum chloride gas from the chlorinator exit gas stream, it is convenient to form the alkali complex as an aid to separation, but this method can be used only if the aluminum chloride is pure, i.e. the gas stream at separation does not contain condensible impurities such as iron chlorides which will condense and form complexes with the aluminum chloride. In the case of chlorination of pure Bayer aluminas, as is presently commercially practiced, the aluminum chloride in the chlorinator stream can be complexed directly.

In the situation where the aluminum chloride feed is derived from an aluminous ore chlorination, large amounts of impurities including iron, titanium and silicon tetrachloride may be in the gas phase. In this situation, it is necessary to prevent the formation of an iron chloride/aluminum chloride complex which condenses near enough in temperature to the aluminum chloride to permit unacceptable impurity contamination of the condensed aluminum chloride-alkali chloride complex.

Preparation of the aluminum chloride complex from a chlorinator stream containing typical impurities associated with aluminous ores such as bauxite or kaolinite can be accomplished by procedures described in U.S. patent application Ser. Nos. 255,355; 255,552; 255,553; 255,549; 255,550 and 255,639 filed of even date herewith.

These procedures use, but are not limited to, the reduction in the chlorinator stream of iron chlorides to all ferrous chloride, condensation of ferrous chloride and aluminum chloride complexes of ferrous chloride by cooling to temperatures near but above the dewpoint of the aluminum chloride dimer and condensation of such impurities with a small portion of the aluminum chloride as a "middling" cut which is recycled.

After removal of a "middling" cut the aluminum chloride gas is contacted with the alkali chloride without attempting heat removal. Due to the heat of condensation and the heat released by the formation of the complex bond between the aluminum chloride and the alkali chloride, the temperature of the mixture will rise. The other impurity chlorides, principally titanium and silicon tetrachloride being well above their boiling points and being covalent species in the presence of an ionic melt have very slight solubility. Titanium and silicon tetrachlorides will be present in the molten complex at levels well below the maximum acceptable impurity levels specified hereinabove.

Separation of the complex from the other gases is at a temperature well above the condensation point of uncomplexed aluminum chloride and so produces a purer aluminum chloride complex. It is a feature of this invention that the purification and separation steps can be accomplished simultaneously.

It is also possible to prepare pure complex by previously purifying by distillation and/or reduction of impure aluminum chloride previously separated from gases associated with its formation by aluminous ore chlorination.

EXAMPLE I

A pebble fluidized bed operated under the conditions of Table I produces a 90% chlorine off gas and a solid product of alumina and NaCl when operated at temperatures above 500° C. with a feed of $NaAlCl_4$ and 10% excess oxygen over the stoichiometric oxygen for oxidation of the aluminum chloride contained in the $NaAlCl_4$ feed stream.

The reactor is made of stainless steel and water-cooled with variable surface area cooling so that the temperature may be controlled by the amount of heat removed from the bed. Temperature is not a critical factor in the reaction as long as it remains above about 500° C.

Tabular alumina pebbles are fluidized by the reaction gases at a superficial gas velocity of about 10'/sec. after heating to the reaction temperature with a gas-air stream.

Solid NaAlCl₄ particles are fed with the oxygen stream to the reactor through a single point distributor with a 60° cone entrance to the fluidized bed. The operating condition and reactor specification are given in Table I.

Gases and solids are taken from an expanded section above the fluidized bed 18' ID and cooled before cycloning to remove the product solids from the gas stream.

EXAMPLE II

The reactor of Example I, heavily insulated so that it can operate as an adiabatic reactor, can be operated as a hydrolyser to produce a hydrolysis alumina product. The fluidized pebble bed is operated at the same velocity range as in the previous example with the gas superficial velocity calculated at exit gas conditions to give a velocity of about 10'/sec.

The heat balance is achieved for this reaction by using a liquid molten alkali metal salt feed direct from an aluminum chloride alkali metal absorber operated in conjunction with a bauxite chlorinator. The salt aluminum/alkali-metal complex is fed to the reactor using a hydrostatic head generated by operating the condensation stage sufficiently high that about 15 psig is available for valving pressure drop to control the salt complex flow. The rate of salt complex flow to the condenser is regulated by chlorine flow to the chlorinator to keep approximate balance with the feed to the hydrolyser and maintain sufficient salt level for the required head.

Saturated 125 psig steam is used to fluidize the pebbles and then react with the salt complex which is fed into the reactor above the steam exit but near the cone. The products are taken overhead as they are abraded from the surface and quenched with cold water. The slurry is cycloned from the quenched stream. Air is added in the quench to maintain an inert gas in the exit system for pressure control. Entering steam is throttled from saturated condition to a super saturated condition downstream of the entrance valve.

TABLE I

| | |
|---|---|
| Reactor Temperature | 550° C. |
| Reactor Diameter | 10" ID |
| Bed Depth (Static) | 7' |
| Pebble Diameter (Tabular Alumina) | ⅛" |
| NaAlCl₄ Feed Rate | 50 lbs./min. |
| Oxygen Feed Rate (95% O₂) | 75 scfm |
| Product Gases | |
| Cl₂ | 80% |
| O₂ | 8.7% |
| Inerts (HCl, N₂, A) | 11.3% |
| Cl₂ Yield | 83% |
| NaAlCl₄ Reacted | 88% |

TABLE II

| | | |
|---|---|---|
| Reactor Temperature | 500–600° C. | (adiabatic operation) |
| Reactor Diameter | 10" ID | |
| Bed Depth (static) | 7' | |
| Pebble Diameter | ⅛" | (tabular alumina) |
| NaAlCl₄ Feed Rate | 50 lbs./min. | |
| Steam Feed Rate | 210 lbs./hr. | (125 psig saturated) |
| Yield Al₂O₃ | 99% | |
| HCl | | |

What is claimed is:

1. A method for the production of reduction cell grade alumina from alkali metal/aluminum chloride complexes comprising the steps of:
   A. reacting the alkali metal/aluminum chloride complexes with oxygen in a three phase fluidized bed comprising:
      (I) as a solid phase, particles or pebbles of alumina of at least about 1/16" in average diameter;
      (II) as a gaseous phase oxygen fed at a rate to provide a fluidizing gas velocity above about 8'/sec.; and
      (III) as a liquid phase coating the particles of alumina an alkali metal/aluminum chloride complex; and
   B. separating the product solids from the gases exiting the fluidized bed.

2. The method of claim 1 wherein the reaction is carried out at a temperature above about 500° C.

* * * * *